Figure 2:
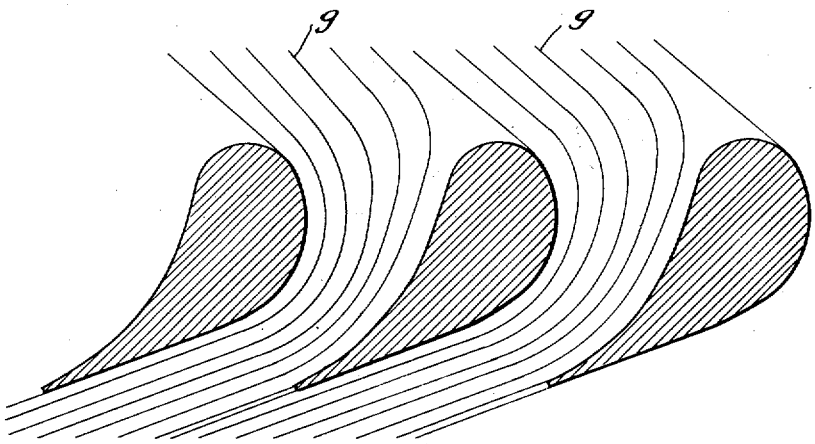

A. LYSHOLM

May 31, 1932. BLADE SYSTEM OF GAS OR STEAM TURBINES Re. 18,485

Original Filed June 21, 1928

Inventor
Alf Lysholm
By
Cameron, Kerkam & Sutton
Attorneys.

Reissued May 31, 1932 Re. 18,485

UNITED STATES PATENT OFFICE

ALF LYSHOLM, OF STOCKHOLM, SWEDEN, ASSIGNOR TO AKTIEBOLAGET LJUNGSTRÖMS ANGTURBIN, OF STOCKHOLM, SWEDEN, A JOINT-STOCK COMPANY

BLADE SYSTEM FOR TURBINES

Original No. 1,777,098, dated September 30, 1930, Serial No. 287,176, filed June 21, 1928, and in Sweden June 30, 1927. Application for reissue filed February 17, 1932. Serial No. 593,673.

The present invention relates primarily to certain improvements in blade systems for gas or steam turbines, the invention having for its primary object to bring about a reduction of the total number of blades required in a turbine.

A characteristic combination of features of the invention is that the thickness of each blade is greater at the inlet side of the blade than at the outlet side thereof, and that the blade pitch is related to the height of the blades as $$k:\sqrt{\sin \alpha},$$

where $$k \gtreqless 0.5 \text{ and } \alpha$$

designates the outlet angle of the blade. By the height of the blades is meant the dimension in the general direction of flow of the driving fluid relative to the blades, as represented by the dimension E in Fig. 1.

A further characteristic combination of features according to the invention is that the maximum thickness of each blade is on the inlet side of the line of gravity of the blade and thence decreases toward the outlet side, and that the blade pitch is related to the height of the blades as $$k:\sqrt{\sin \alpha},$$

where $$k \gtreqless 0.5 \text{ and } \alpha$$

designates the outlet angle of the blade.

A further characteristic combination of features is that each blade has a rounded shape toward the incoming steam, and that the blade pitch is related to the height of the blades as $$k:\sqrt{\sin \alpha},$$

where $$k \gtreqless 0.5 \text{ and } \alpha$$

designates the outlet angle of the blade.

A further and generally more specific characteristic combination of features is that the thickness of each blade is greater at the inlet side of the blade than at the outlet side thereof, and that the blade pitch is 0.9 to 1.2 times the dimension E of the blades.

A further characteristic combination of features of generally more specific nature is that the maximum thickness of each blade is on the inlet side of the line of gravity of the blade and thence decreases toward the outlet side, and that the blade pitch is 0.9 to 1.2 times the dimension E of the blades.

A still further characteristic combination of features of generally more specific nature is that each blade has a rounded shape toward the incoming driving fluid, and that the blade pitch is 0.9 to 1.2 times the dimension of the blades, measured in the direction of flow of the driving fluid.

Other and more detailed characteristics of blading embodying the invention will be pointed out in the ensuing description and in the appended claims.

The feature of providing rounded inlet edges in the blades of elastic fluid turbines, and of thus imparting to the blades a streamline contour to increase the efficiency of the individual blades, is known to be previously suggested in the art of turbine design, whereas the combined features of rounding the inlet edges of the blades or of locating the maximum thickness of each individual blade to the inlet side of the blade, and of providing a blade pitch which is related to the height of the blades as $$k:\sqrt{\sin \alpha},$$

where $$k \gtreqless 0.5 \text{ and } \alpha$$

designates the outlet angle of the blade, or which more specifically is 0.9 to 1.2 times the height of the blades, are novel and characteristic of my present invention, to the best of my knowledge and belief.

Figure 3:
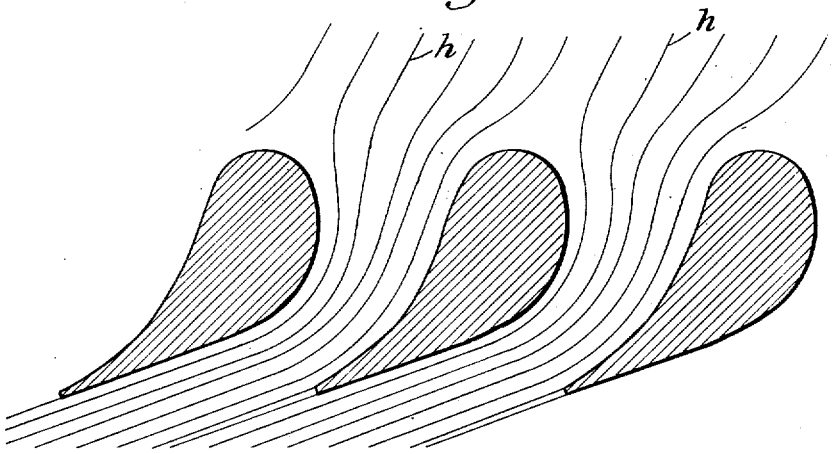
Figure 1:
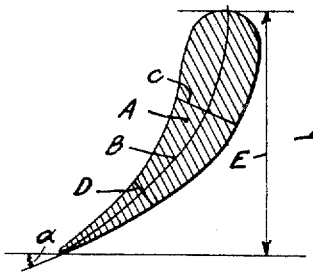

In the acompanying drawing, Fig. 1 represents a cross-section of one of the blades of the improved blade system according to the invention. Figs. 2 and 3 show a few blades of the type involved in the present invention and spaced in a manner falling within the scope of the invention.

With reference to Fig. 1 of the drawing, A denotes the center of gravity of the blade, while B is the center line of the blade. This center line is divided into three equal parts, and through the dividing points intersecting lines C and D are drawn at right angles to the center line. E is the height of the blade, that is to say, its dimension measured in the general direction of flow of the driving fluid, this direction being axial in an axial-flow turbine and radial in a radial-flow turbine. $\alpha$ designates the outlet angle of the blade.

As will be clearly seen, the greatest thickness of the blade is on the inlet side of the blade, the said thickness being located in front of the center of gravity A.

It will also be observed that the center of gravity A is nearer to the inlet side of the blade than to the outlet side thereof. This is due to the fact that the blade is of substantially greater thickness adjacent to its inlet side, as compared with its maximum thickness, than are blades of usual profile.

From the drawings it will be evident that blades of the character contemplated by my invention have profiles providing blades with generally rounded inlet surfaces and with concave and convex side surfaces. With such blades the concave side surfaces and the inlet surfaces join or merge along lines parallel to the longitudinal axes of the blades, at which lines the blade surfaces change from concave surfaces to surfaces which are generally convex. Such lines may conveniently be termed lines of reverse curvature.

I have found that in order to utilize to the fullest extent the potential advantages of my invention, each blade should be of the general shape illustrated, in that the thickness of the blade at the line of reverse curvature, which it will be observed is adjacent to the inlet side of the blade, is equal to at least a major portion of the maximum blade thickness and may in some instances be equal to or constitute the maximum blade thickness. In the blade shown in Fig. 1, the blade thickness at the line of reverse curvature is substantially the same as the maximum blade thickness, and in the blades shown in Figs. 2 and 3 the blade thickness at the line of reverse curvature is well over fifty per cent of the maximum blade thickness.

With the mass of the blade so distributed, I have discovered that the most suitable range of pitch ratios of the turbine blading, that is to say, the most suitable values of distance between the blades, as compared with the height of the blades, having regard to the outlet angles, will be obtained if the pitch is related to the height of the blades as $$k:\sqrt{\sin \alpha}$$

where $k \gtrless 0.5$, as will hereinafter be more fully explained.

In general it may be said that with a given blade profile the proper pitch between blades is different for different values of the outlet angle $\alpha$ of the blading and I have therefore provided means for defining the pitch characteristic of the present invention in such manner as to take into account the several values of the outlet angle $\alpha$ which may be employed. This means for defining the invention comprises the hereinbefore stated formula in which the ratio of the pitch of the blading with respect to the height of the blades in the direction of the flow of fluid therethrough is equal to the ratio of a factor $k$ divided by $$\sqrt{\sin \alpha},$$

the factor $k$, if the pitch of the blading is to be within the scope of the present invention, being $\gtrless 0.5$. It will be evident that by defining this characteristic of the invention through the medium of the formula above set forth, the absolute value of the pitch ratio of the blading for a given value of $k$ will be different for different values of the outlet angle of the blading, which is the condition existing in actual practice. In other words, the maximum value of the pitch ratio heretofore employed in the prior art is not a constant but is a value varying with variations in the outlet angle of the blading. Likewise, in the exercise of the present invention, the value of the pitch ratio to be employed in any specific instance (other factors being equal) depends upon the value of the outlet angle of the specific blading in question. By means of the above stated formula I am enabled to clearly define this characteristic of the present invention and to also clearly distinguish my improvement from the practice of the prior art, while at the same time taking into account variations in the value of the minimum pitch ratio falling within the scope of the present invention, which variations occur because of permissible variations in the outlet angle in the blading.

For example, let us take the case in which the outlet angle of the blading is 20° (which angle is representative of a normal turbine design) and in which the pitch ratio is unity. Designating the blade pitch as $p$, and the blade height (dimension E, Fig. 1) as $h$, and applying the formula, $$p/h = k/\sqrt{\sin \alpha},$$

and substituting the assumed values, the formula becomes $$1/1 = k/\sqrt{\sin 20°}.$$

Solving for $k$, we find $k=.585$, from which it is immediately evident that blading for an outlet angle of 20° and a pitch ratio of unity falls within the scope of pitch characteristic of the present invention.

Considering the matter from another angle, let us determine the minimum pitch ratio for 20° blading which falls within the scope of the feature of the invention defined by the formula. The formula $$p/h=k/\sqrt{\sin \alpha}$$

then becomes $$p/h=.5/\sqrt{\sin 20°}.$$

Solving for $p/h$ we find its value to be .855. Following similar procedure we find that for 15° blading, the minimum pitch defined by the formula is .984 and for 25° blading the corresponding value is .77. For abnormally large outlet angles, such for example as 40°, the corresponding value is .624, but as will be appreciated by those skilled in the art, the proper pitch ratio for blading of this extreme type, according to the teaching of the prior art, is materially smaller than this figure.

Insofar as I am aware, no blade construction in the prior art has contemplated the use of blading having a pitch as great as 0.9 of the height of the blades, regardless of the outlet angle employed. A pitch ratio of about 0.7 represents the maximum employed in the prior art and this value has heretofore been employed only with blading having small outlet angles, while blading for larger and more usual outlet angles has been used with a maximum pitch ratio of materially smaller value. The present invention therefore may be further and more generally specifically defined by the combination of blading having the profile characteristics herein set forth and a pitch ratio characteristic of not less than the absolute value herein given. This more limited definition of the invention relates more specifically to that portion of the field of turbine design represented by blading having outlet angles within the range of what has become established as normal or usual design.

The advantage is gained through the present invention that a smaller number of blades are required in the whole turbine than hitherto, the possible reduction of the number of blades being, in fact 20 to 40%, involving a corresponding reduction in the cost of manufacture.

In Fig. 2, which illustrates a blade system according to the invention where the thickness of each blade is greater at the inlet side of the blade than at the outlet side thereof, a path of the driving fluid between the blades is indicated by lines $g$.

Fig. 3 shows how the fluid, the path of which is indicated by the lines $h$, $h$, passes the same blades as those shown in Fig. 2, but under a different relative inlet angle. On account of the increasing width and rounding of the blade section toward the incoming driving fluid, eddies which arise in blade systems comprising blades of usual profile, on account of variations in the direction and velocity of the incoming driving fluid, are not produced. It has been shown by trials that the incoming driving fluid may vary materially both with respect to velocity and direction, without the efficiency of the present blade system being appreciably impaired thereby.

As illustrated, the blades of a blade system according to the invention are given a greater thickness at the inlet side of the blade row than at the outlet side thereof, and the edges of the blades directed toward the entering driving fluid are rounded on the lines of conic curves such as circles, ellipses, parabolas or hyperbolas, or have an approximately similar shape.

By thus adopting blades of the shape disclosed in Figs. 1, 2 and 3 for the blade system according to the present invention, the further advantage is gained, in addition to that of a reduced number of blades, that the losses will be comparatively independent of the direction of the incoming driving fluid. Therefore, the efficiency of the blade system will be independent of the variations and speed conditions involved by overloading, reduced loading or a variable number of revolutions of the turbine. Moreover, when steam is used as a driving fluid, such blade systems are suitable in localities where the percentage of moisture of the steam is high, inasmuch as they offer, in the first place, greater resistance to wear and, furthermore, are suited to the altered inlet angles under which the moisture of the steam is supplied to the blade system.

Inasmuch as the novel blade systems are to a greater extent independent of the inlet angle of the fluid, it is no longer necessary, as is the case in certain turbines, that blades be made in different sizes, for instance with radial dimension of 5, 7 or 10 millimeters, and that each dimension be made in 10 different blade profiles suited to different inlet and outlet angles, or, altogether, about 30 different blade profiles. Blade systems according to the present invention may be built with blades of a single size having a dimension of 10 millimeters in the direction of flow of the fluid, and only 2 or 3 blade profiles are required for different directions and velocities of the fluid. In the standardization of turbine manufacture with blade systems according to the invention it will thus only be necessary to make $\frac{1}{10}$ of the number of blade types that has been previously required.

The above mentioned reduction in the total number of blade profiles required when the present invention is availed of is due to the fact that with blades having profile and pitch characteristics in accordance with the present invention, a single blade profile will give satisfactory results when incorporated in any normal turbine design in which reaction blading is employed and in which the characteristic of the velocity triangle is such that the ratio of $u/c$ ($u$ being the peripheral velocity of the blading and $c$ being the inlet velocity of the driving fluid) is from 0.5 to 0.9 and a second blade profile will be similarly satisfactory in turbines in which the velocity triangle gives a ratio of $u/c$ of from 0.8 to 1.3. Satisfactory turbines in which the ratio of $u/c$ is anywhere from 0.5 to 1.3 may be built with blading having either one of only two blade profiles.

Furthermore, I have found that with blades having a profile and pitch characteristics of the present invention, satisfactory variable speed turbines, in which the ratio $u/c$ may vary from zero to 1.5 with variations in the speed of the turbine, may be built with blades of one profile.

From the foregoing, it will be seen that, in accordance with the present invention, not more than three blade profiles are required in order to take care of the full range of turbine designs normally encountered, blades of one profile being sufficient for variable speed turbines and blades of two different profiles being sufficient for constant speed turbines having normally encountered velocity characteristics.

On account of the above it may be of advantage, economically, to provide blades milled in their entirety and inserted directly into the ring bonds uniting the blades in the blade rings, it being then also possible to make the outer blade lengths of radial flow turbines at least 20% longer, whereby the output of the turbine may be increased in a corresponding degree, or, if the same blade length is employed, while the height of the blade is reduced, the sum of the squares of the blade speeds may be increased. In order to obtain a turbine, for example a back pressure turbine with possibilities of overloading by means of by-passage while maintaining a good efficiency under all conditions, the relation of the velocity $u/c$ should be great. With a blade system according to the invention, this relation $u/c$ may be increased to values $>0.8$, without having to resort to the thin blade profiles of earlier constructions. Moreover, a turbine constructed with a blade system according to the invention will obtain an increased turning moment at the moment of starting, and for this reason such a turbine can better be used, for instance as a motor for the driving of locomotives, whereby the capability of the locomotive to force gradients is increased.

In the above, I have shown that with blade profiles of the type to which the invention applies, the pitch ratio can be much greater than normal pitch ratios for standard blades as generally used in steam turbines, and I have indicated a lower limit above which it is advantageous to have the pitch ratio. It is not necessary to specify a fixed upper limit because a person skilled in this art knows or can readily determine beyond what value the blade pitch, having regard for the height of the blades, will result in the provision of channels for flow of driving fluid of such excessive width as to have impractical operating characteristics. However, I have indicated, from my studies in connection with locomotive turbines that 1.2 is a reasonable upper limit for such type of load.

While I have particularly developed the blading herein described for steam or gas turbines, the invention is not necessarily restricted to this type of driving fluid.

What I claim is:

1. In a blade system for gas or steam turbines, the combination of the features that the thickness of each blade is greater at the inlet side of the blade than at the outlet side thereof, and that the blade pitch is related to the height of the blades as $$k:\sqrt{\sin \alpha},$$

where $k \geqq 0.5$ and less than a value resulting in channels of impractical width and $\alpha$ designates the outlet angle of the blade.

2. In a blade system for gas or steam turbines, the combination of the features that the maximum thickness of each blade is on the inlet side of the center of gravity of the cross section of the blade and thence decreases toward the outlet side, and that the blade pitch is related to the height of the blades as $$k:\sqrt{\sin \alpha},$$

where $k \geqq 0.5$ and less than a value resulting in channels of impractical width and $\alpha$ designates the outlet angle of the blade.

3. In a blade system for gas or steam turbines, the combination of the features that each blade has a rounded shape toward the incoming steam, and that the blade pitch is related to the height of the blades as $$k:\sqrt{\sin \alpha},$$

where $k \geqq 0.5$ and less than a value resulting in channels of impractical width and $\alpha$ designates the outlet angle of the blade.

4. In a blade system for gas or steam turbines, the combination of the features that the thickness of each blade is greater at the inlet side of the blade than at the outlet side thereof, and that the blade pitch is 0.9 to 1.2 times the height of the blades.

5. In a blade system for gas or steam turbines, the combination of the features that the maximum thickness of each blade is on the inlet side of the center of gravity of the cross section of the blade and thence decreases toward the outlet side, and that the blade pitch is 0.9 to 1.2 times the height of the blades.

6. In a blade system for gas or steam turbines, the combination of the features that each blade has a rounded shape toward the incoming driving fluid, and that the blade pitch is 0.9 to 1.2 times the height of the blades.

7. In a blade system for gas or steam turbines, the combination of the features that the inlet edge of each blade is of a circular cross-section, and that the blade pitch is related to the height of the blades as $$k:\sqrt{\sin \alpha},$$

where $k \geqq 0.5$ and less than a value resulting in channels of impractical width and $\alpha$ designates the outlet angle of the blade.

8. In a blade system for gas or steam turbines, the combination of the features that the inlet edge of each blade is of a circular cross-section, and that the blade pitch is 0.9 to 1.2 times the height of the blades.

9. In turbine blading, a row of blades having a blade pitch of at least 0.9 times the height of the blades and less than a value resulting in channels of impractical width, each blade having a profile comprising approximately a conic curve at the inlet side of the blade row.

10. In turbine blading, a row of blades in which the pitch is related to the height of the blades as $$k:\sqrt{\sin \alpha},$$

where $\alpha$ is the outlet angle of the blading and $k \geqq 0.5$ and less than a value resulting in channels of impractical width and in which each blade has a profile comprising approximately a conic curve at the inlet side of the blade row.

11. In turbine blading, a row of blades in which the pitch is related to the height of the blades as $$k:\sqrt{\sin \alpha},$$

where $\alpha$ is the outlet angle of the blading and $k \geqq 0.5$ and less than a value resulting in channels of impractical width and in which each blade has a profile such that the maximum thickness of the blade is on the inlet side of the center of gravity of the cross section of the blade and the portion of the profile at the inlet side of the blade row approximates a conic curve.

12. In turbine blading, a row of blades having a pitch of at least 0.9 times the height of the blades and in which the pitch is so related to the height of the blades that in the equation $$p/h = k:\sqrt{\sin \alpha},$$

$k \geqq 0.5$ and less than a value resulting in channels of impractical width, where $\alpha$ is the outlet angle of the blading, and each blade having a profile such that the maximum thickness of the blade is on the inlet side of the center of gravity of the cross section of the blade and the portion of the profile at the inlet side of the blade row is curved.

13. In a turbine blading, a row of blades having substantially thickened portions adjacent to the inlet side of the row, the lines of the centers of gravity of the cross-sections of the blades being nearer to the inlet side of the row than to the outlet side thereof, the maximum thickness of the blades being nearer to the inlet side of the row than said lines of the centers of gravity, the blades being pitched to provide channels for flow of driving fluid not exceeding in width a value giving practical operating characteristics to the channels, and the pitch being so related to the height of the blades that $k \geqq 0.5$ in the equation $$p/h = k/\sqrt{\sin \alpha}$$

where $\alpha$ is the outlet angle of the blades in the row.

14. In turbine blading, a row of blades having substantially thickened portions adjacent to the inlet side of the row, the lines of the centers of gravity of the cross-sections of the blades being nearer to the inlet side of the row than to the outlet side thereof, the maximum thickness of the blades being nearer to the inlet side of the row than said lines of the centers of gravity, the blades being pitched to provide channels for flow of driving fluid not exceeding in width a value giving practical operating characteristics to the channels and the blade pitch being equal to at least 0.9 times the height of the blades.

15. In turbine blading, a row of blades having substantially thickened portions adjacent to the inlet side of the row, the lines of the centers of gravity of the cross-sections of the blades being nearer to the inlet side of the row than to the outlet side thereof, the maximum thickness of the blades being nearer to the inlet side of the row than said lines of the centers of gravity and the blade pitch being 0.9 to 1.2 times the height of the blades.

16. In turbine blading, a row of blades having profiles providing inlet surfaces and concave and convex side surfaces, the thickness of the blades at the lines of reverse curvature where the inlet surfaces and the concave side surfaces join being equal to at least a major portion of the maximum thickness of the blades, the blades being pitched to provide channels for flow of driving fluid not exceeding in width a value giving practical operating characteristics to the channels and the pitch being so related to the height of the blades that $k \geqq 0.5$ in the equation $$p/h = k/\sqrt{\sin \alpha}$$

where $\alpha$ is the outlet angle of the blades in the row.

17. In turbine blading, a row of blades having profiles providing inlet surfaces and concave and convex side surfaces, the thickness of the blades at the lines of reverse curvature where the inlet surfaces and the concave side surfaces join being equal to at least a major portion of the maximum thickness of the blades, the blades being pitched to provide channels for flow of driving fluid not exceeding in width a value giving practical operating characteristics to the channels and the blade pitch being equal to at least 0.9 times the height of the blades.

18. In turbine blading, a row of blades having profiles providing inlet surfaces and concave and convex side surfaces, the thickness of the blades at the lines of reverse curvature where the inlet surfaces and the concave side surfaces join being equal to at least a major portion of the maximum thickness of the blades and the blade pitch being 0.9 to 1.2 times the height of the blades.

In testimony whereof, I hereunto affix my signature.

ALF LYSHOLM.